United States Patent [19]

Carnewal et al.

[11] 4,100,720
[45] Jul. 18, 1978

[54] GRAIN TANK AND GRAIN CONVEYOR MEANS OF HARVESTING MACHINES

[75] Inventors: José A. C. L. Carnewal, Eeklo; Frans J. G. C. Decoene, Zedelgem, both of Belgium; Cornelis G. M. Muijs, Flagey-Echezéaux, France

[73] Assignee: Clayson N.V., Zedelgem, Belgium

[21] Appl. No.: 699,114

[22] Filed: Jun. 23, 1976

[30] Foreign Application Priority Data

Jun. 26, 1975 [GB] United Kingdom ............... 27066/75

[51] Int. Cl.² .......................................... A01D 45/00
[52] U.S. Cl. .................................. 56/14.6; 130/27 R
[58] Field of Search .......................... 56/14.3–14.6; 130/27 R

[56] References Cited

U.S. PATENT DOCUMENTS

| | | | |
|---|---|---|---|
| 3,538,689 | 11/1970 | van der Lely | 56/14.6 |
| 3,680,291 | 8/1972 | Soteropulas | 56/14.6 |
| 3,703,802 | 11/1972 | Wrestler et al. | 56/13.3 |
| 3,797,502 | 3/1974 | Reed et al. | 130/27 R |

FOREIGN PATENT DOCUMENTS

1,802,135  5/1970  Fed. Rep. of Germany ........ 56/14.6

*Primary Examiner*—Russell R. Kinsey
*Attorney, Agent, or Firm*—Frank A. Seemar; John B. Mitchell; Joseph A. Brown

[57] ABSTRACT

According to the present invention a harvesting machine comprises a chassis with threshing and separating means and a power source mounted thereon and a grain tank pivotally mounted whereby it can be tipped to discharge grain contained therein rearwardly of the machine. The harvesting machine further also comprises a grain cleaning means mounted on the chassis and a conveyor means for loading grain into the grain tank. The conveyor means comprises a lower elevator extending from the grain cleaning means to the grain tank, an upper elevator mounted within the grain tank and aligned with the lower elevator when the grain tank is in the grain loading position, and disengageable coupling means disposed between the lower and upper elevators.

22 Claims, 11 Drawing Figures

GRAIN TANK AND GRAIN CONVEYOR MEANS OF HARVESTING MACHINES

BACKGROUND OF THE INVENTION

1. Field of the Invention

The present invention relates to harvesting machines such as combine harvesters (also referred to hereinafter as combines).

While the terms "grain" and "straw" are used principally throughout this specification for convenience, it should be understood that the terms are not intended to be limiting. Thus "grain" refers to that part of the crop material which is threshed and separated from the discardable part of the crop material which is referred to as "straw".

DESCRIPTION OF THE PRIOR ART

Conventional combines generally comprise a chassis with a front pair of traction wheels and a rear pair of steerable wheels. The chassis supports at its forward end a header and elevator for feeding cut crop to threshing means from which the threshed crop is passed to elongated fore-and-aft extending straw walkers mounted to the rear of the chassis. The straw walkers are relatively large and extend rearwardly into a straw hood mounted at the rear end of the machine. The machine further comprises a cleaning device located below the threshing means and straw walkers and an elevator for feeding cleaned grain into a grain tank or bin on top of the machine. The grain tank often is generally square in plan view and of a substantial height (for example 1.25 m to 1.50 m) and is often located rearwardly of the operator's platform and forwardly of the engine compartment. Finally a grain unloading tube is normally pivotally secured to the grain tank. In operation of the conventional combine, the crop is fed to the threshing means, comprising a transversely-extending threshing cylinder and a cooperable concave, and is passed between the cylinder and concave, whereby it is threshed. The resulting straw is discharged rearwardly of the concave onto the reciprocating or oscillating straw walkers which extend longitudinally of the combine. Much of the grain contained in the crop material fed through the threshing mechanism is threshed and separated by that mechanism and some of the remainder is separated from the straw whilst the latter is on the straw walkers. Straw walkers have proved to be the capacity-limiting components of the conventional combine because when operating at a high capacity rate, much grain is discharged with the straw to the straw walkers which are unable to cope with the required separation and hence unacceptable grain losses occur.

Also conventional combine harvesters have become relatively large whereby the manoeuvrability has been impaired. Adding to this problem is the height of the grain tank which seriously hampers the visibility of the operator around and rearwardly of his machine when manoeuvring.

With the conventional grain tank unloading means, grain tank unloading can be effected whilst continuing the harvesting operation but in practice, the machine is often stopped for the unloading operation. The time required for this operation is therefore also a significant capacity-limiting factor.

For loading threshed, separated and cleaned grain in the grain tank, conventional combine harvesters normally comprise conveyor means having a lower transverse auger located below grain cleaning means, a generally upright paddle-type elevator extending from the lower tranverse auger to a position either towards or at the top of the grain tank, or to a location thereabove, and a transverse distributing auger in or above the grain tank for distributing the grain in the tank. In another known structure, the paddle-type elevator extends only to the base of the grain tank and another auger-type elevator projects upwardly through the grain tank.

SUMMARY OF THE INVENTION

It is the object of the present invention to eliminate or to attenuate one or more of the aforementioned drawbacks with conventional machines and to provide a machine with reduced dimensions both lengthwise and heightwise and yet which will have the same, or even larger, capacity than the comparable conventional machine.

According to one aspect of the present invention, a harvesting machine comprises a chassis with threshing and separating means and a power source mounted thereon and a grain tank pivotally mounted whereby it can be tipped to discharge grain contained therein rearwardly of the machine.

When compared with the grain tank of a conventional machine, the grain tank of a machine according to the present invention preferably has a relatively small height in relation to the fore-and-aft dimension. The grain tank preferably extends from immediately behind the power source to the rearmost end of the machine and overhangs the latter. The width of the grain tank may be as great as that of the machine and is subject, therefore, only to the constraints imposed on vehicle widths by the laws of various countries. A typical permitted width is 3 meters. The grain tank may have a base having a front portion which extends generally horizontally when the tank is in a loading position and a rearward portion which is upwardly inclined relative to the front portion and which acts as a chute for unloading grain from the tank when the latter is tipped or pivoted to the discharge position. The side walls of the grain tank may converge towards each other at the discharge end thereof for confining the mass of discharged grain. The grain tank pivot axis preferably extends transversely of the machine adjacent the rearmost edge thereof and a pair of hydraulic cylinders may be provided between the chassis and the grain tank to effect tipping of the latter. Preferably, the hydraulic cylinders are arranged so that during unloading of the grain tank the major portion of the weight of the grain tank is supported on the cylinders rather than on the grain tank pivot shaft.

With the known grain tank loading conveyor means, at least portions thereof would, if a pivotal grain tank were provided, interfere with the tipping operation thereof in the absence of special precautions. Furthermore, full and even loading of the preferred form of a grain tank provided on a machine in accordance with the present invention would be impossible with conventional loading conveyor means.

According to another aspect of the present invention, a harvesting machine comprises a chassis, grain cleaning means mounted on the chassis, a grain tank pivotally mounted on the chassis whereby it can be tipped to discharge grain contained therein, and conveyor means for loading grain into the grain tank, the conveyor means comprising a lower elevator extending from the grain cleaning means to the grain tank, an upper elevator mounted within the grain tank and aligned with the lower elevator when the grain tank is in the grain loading position, and disengageable coupling means disposed between the lower and upper elevators.

Preferably the upper and lower elevators are of the auger type. The lower elevator may extend in an upward direction from one side of the cleaning means and the upper end of the upper elevator may be positioned generally above the middle of the grain tank, whereby both elevators are inclined inwardly of the machine. The coupling means between the upper and lower elevators enable the lower elevator to drive the upper elevator when the grain tank is in the loading position.

To facilitate even loading of grain in the grain tank, the upper elevator is preferably provided with fore-and-aft grain dividing means which may be in the form of opposed augers.

The separating means are peferably in the form of a rotary separator and may be similar to that disclosed in the copending Canadian patent application No. 203.582 respectively U.S. Pat. No. 3,946,746. According thereto, there is provided a harvesting machine comprising a transversely extending threshing mechanism having a threshing cylinder cooperable with a threshing concave and a rotary separating mechanism of a width greater than that of the threshing mechanism and disposed parallel thereto with its ends extending past the respective ends of the threshing mechanism and being arranged spirally to convey the crop material received from the threshing mechanism towards each of its ends while submitting the crop to a separating action.

The separating mechanism may comprise a transversely extending separating rotor having crop treating and crop conveying elements cooperable with a separating concave and operable in use to separate grain from the straw while conveying half the mat of the straw in a spiral path to one end for discharge and the remainder of the straw in an opposite spiral path to the opposite end for discharge. Preferably the separating mechanism comprises at least two transversely extending rotors arranged in side-by-side relationship in a single separator casing part defined by separator concaves. The rotors may be driven in the same direction and the crop is conveyed thereby in spiral paths which extend around both rotors at the inner side of said casing. Preferably the spiral paths do not comprise more than one and a half loops or turns.

Preferably the conveyor means extend from adjacent one side of the cleaning means in upward direction and are slightly inclined in transverse direction at a location within the outer sides of the separating mechanism and rearwardly thereof.

IN THE DRAWINGS

A combine harvester embodying the present invention will now be described in greater detail, by way of example, with reference to the accompanying drawings, in which.

DESCRIPTION OF THE PREFERRED EMBODIMENT

Figure 1:
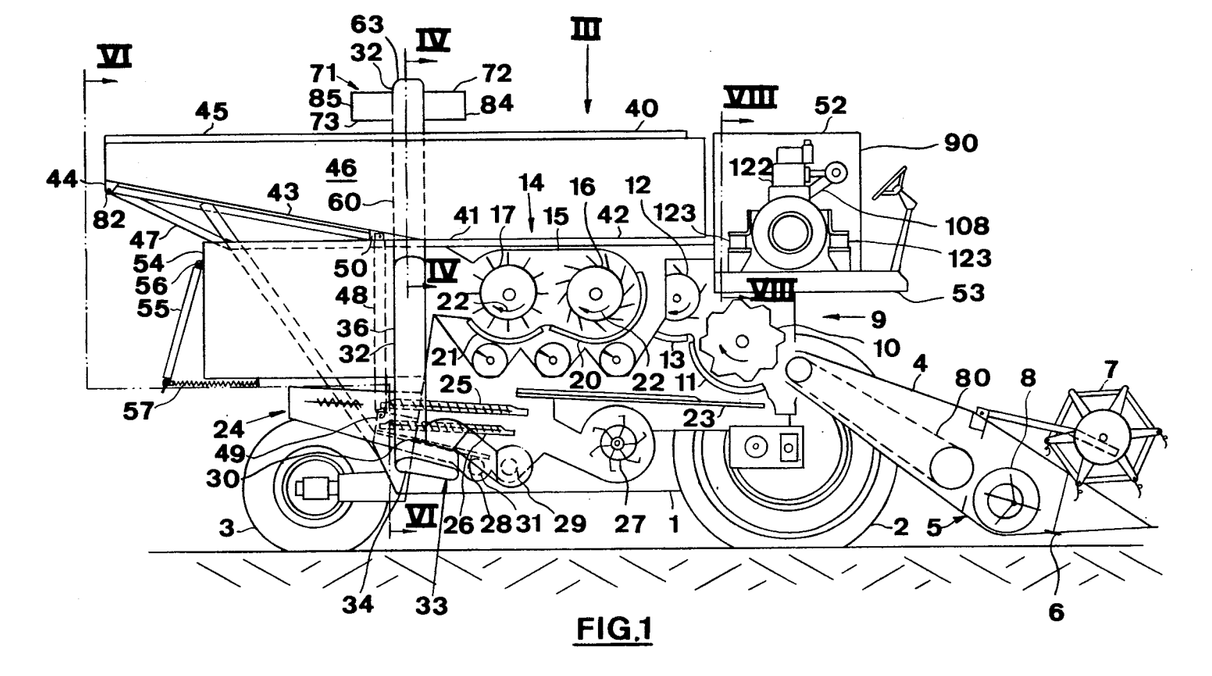
FIG. 1 is a schematic side view of the combine harvester.
Figure 3:
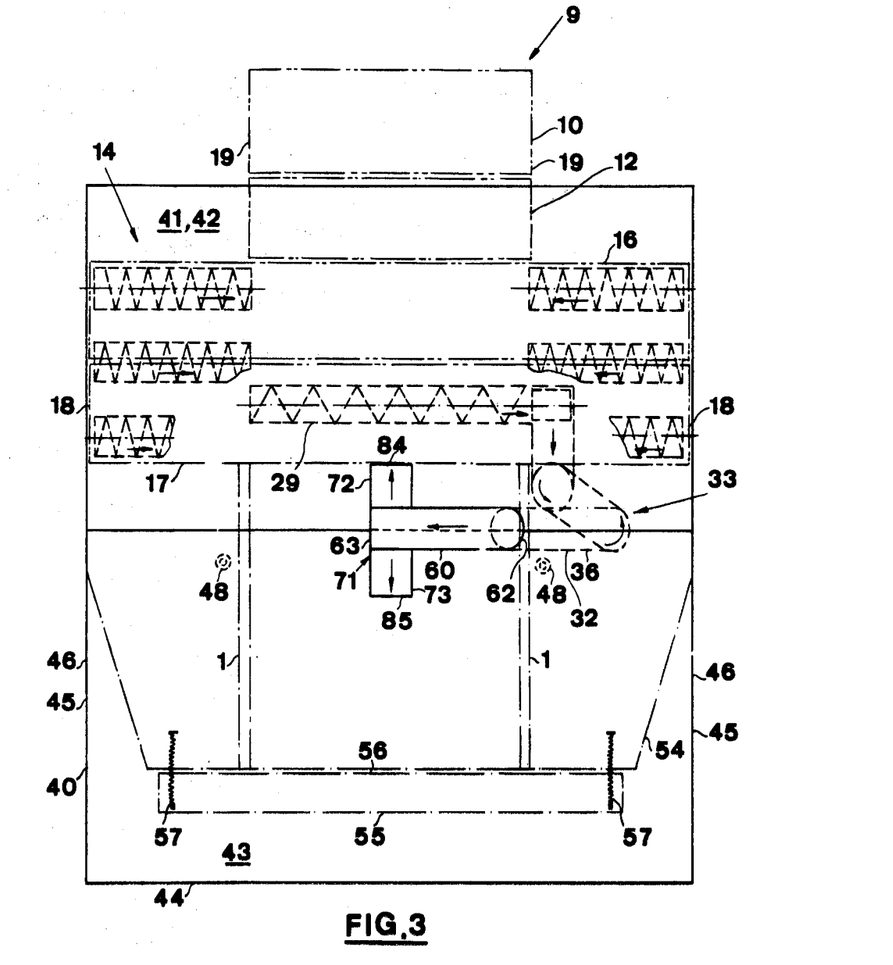
FIG. 3 is a partial schematic top view in the direction of arrow III in FIG. 1, FIGS. 4a and 4b are partial sectional views taken along the lines IV—IV of FIG. 1.
Figure 4A:
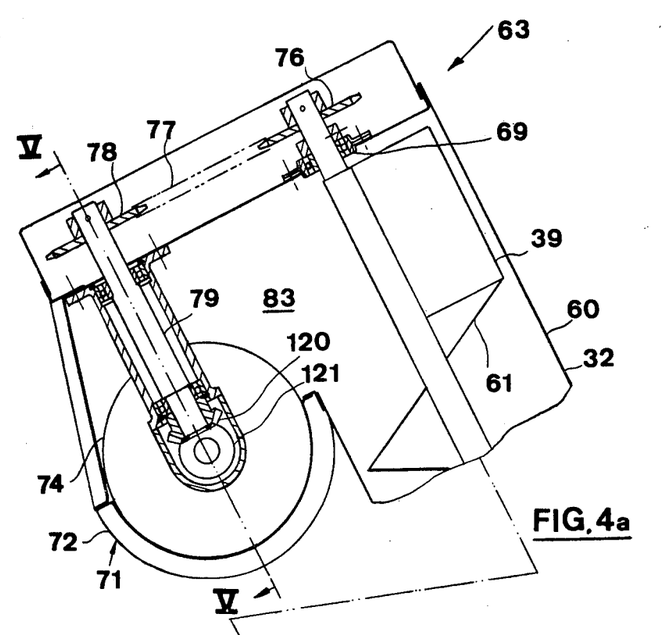
Figure 4B:
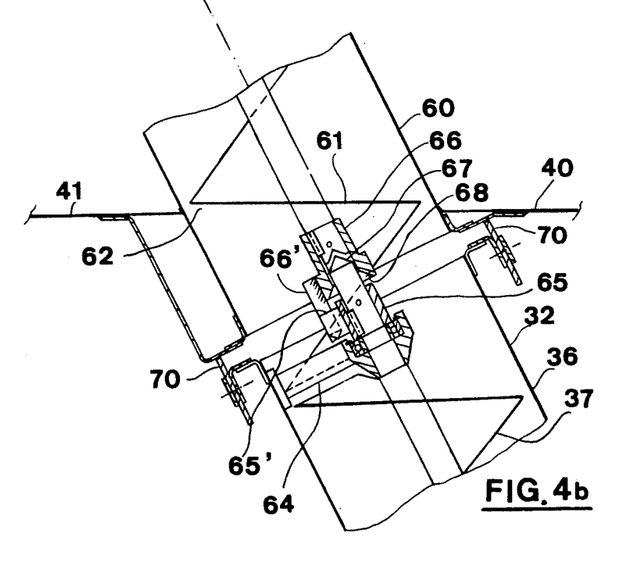
Figure 5:
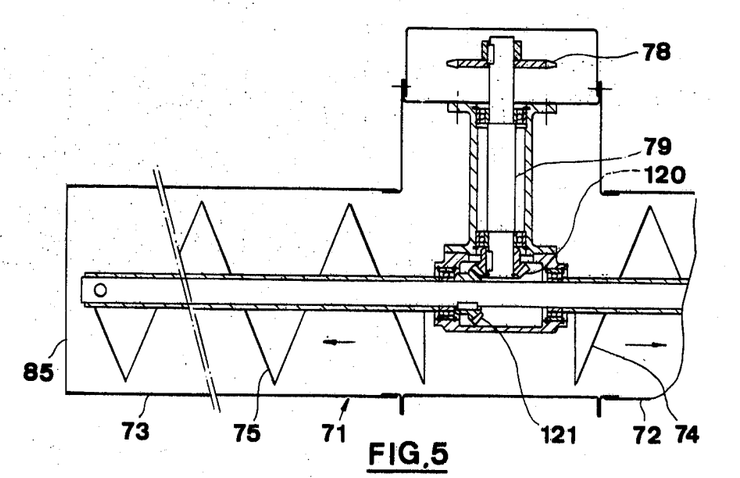
FIG. 5 is a sectional view taken along the lines V—V of FIG. 4a, FIG. 6 is a schematic view taken along the lines VI—VI in FIG. 1.

With reference to FIG. 1, the combine harvester is of the self-propelled type and comprises a chassis 1 supported on a pair of front traction wheels 2, and a pair of rear steerable wheels 3. The chassis 1 supports at its forward end a conventional elevator 4 with a heater 5 thereon. The header 5 comprises a cutter bar 6, a reel 7, and a header auger 8 for feeding cut crop material to the elevator 4, an chain elevator 80 of which further conveys the crop material towards threshing means generally indicated at 9. The threshing means 9 are of the conventional type and generally comprise a threshing cylinder 10 cooperable with a threshing concave 11. The crop material is passed between the threshing cylinder 10 and threshing concave 11, the threshed grain falling through the concave to grain cleaning means. The resulting straw mat is fed to a deflector or straw beater 12 which cooperates with a grate 13 to effect further grain separation and to pass the straw mat to a rotary separating mechanism generally indicated at 14. The separating mechanism 14 comprises a single casing 15 with a pair of transversely-extending rotors 16, 17 mounted therein. The width of the separating mechanism 14 substantially exceeds the width of the threshing mechanism 9 while the plane of symmetry of the former coincides with the plane of symmetry of the latter, whereby the outer ends 18 (FIG. 3) of the separator mechanism 14 extend beyond the respective ends 19 of the threshing mechanism 9. The rotors 16, 17, comprise crop feeding and conveying elements cooperable with separating concaves 20, 21, whereby, in use, they serve to separate grain from the straw mat while conveying approximately half of the mat in a spiral path to one side 18 for discharge and the remainder of the mat in an opposite spiral path to the opposite side 18 for discharge. The rotors 16, 17 are driven in the same direction 22 and the crop is conveyed thereby in spiral paths which extend around both rotors 16, 17, at the inner side of the casing 15.

The grain separated from the straw by the threshing means 9, the straw beater 12 and the separating mechanism 14 falls onto a grainpan 23, forming part of the cleaning means, which conveys the grain to a cleaning shoe 24 comprising cleaning sieves 25, 26, and a cleaning fan 27. The cleaning fan 27 directs a cleaning air blast from below through the cleaning sieves 25, 26 to remove chaff and other impurities while the clean grain falls through the sieves onto a chute 28 which further directs the clean grain to a clean grain auger 29. The tailings are discharged onto a chute 30 which conveys them to a tailings auger 31. thereafter, the tailings are treated in a manner generally known in the art.

Figure 6:
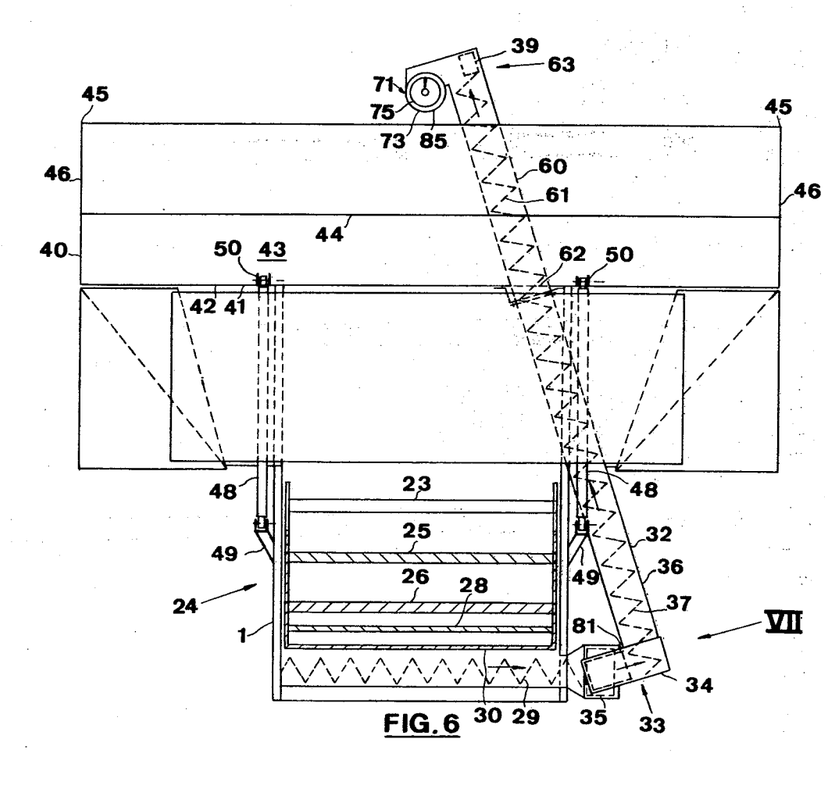
Figure 7:
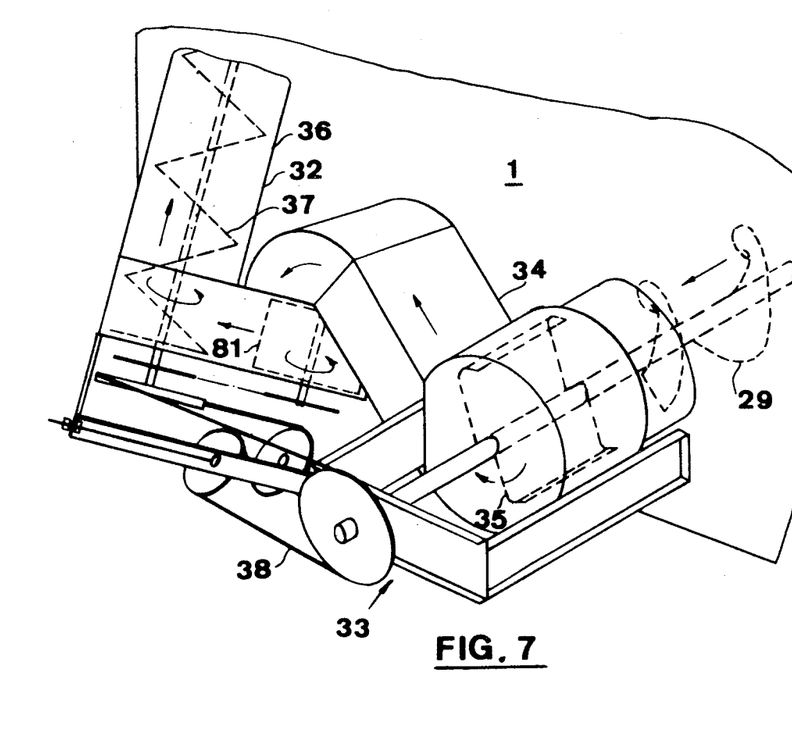
FIG. 7 is a partial perspective view in the direction of arrow VII in FIG. 6
Figure 8:
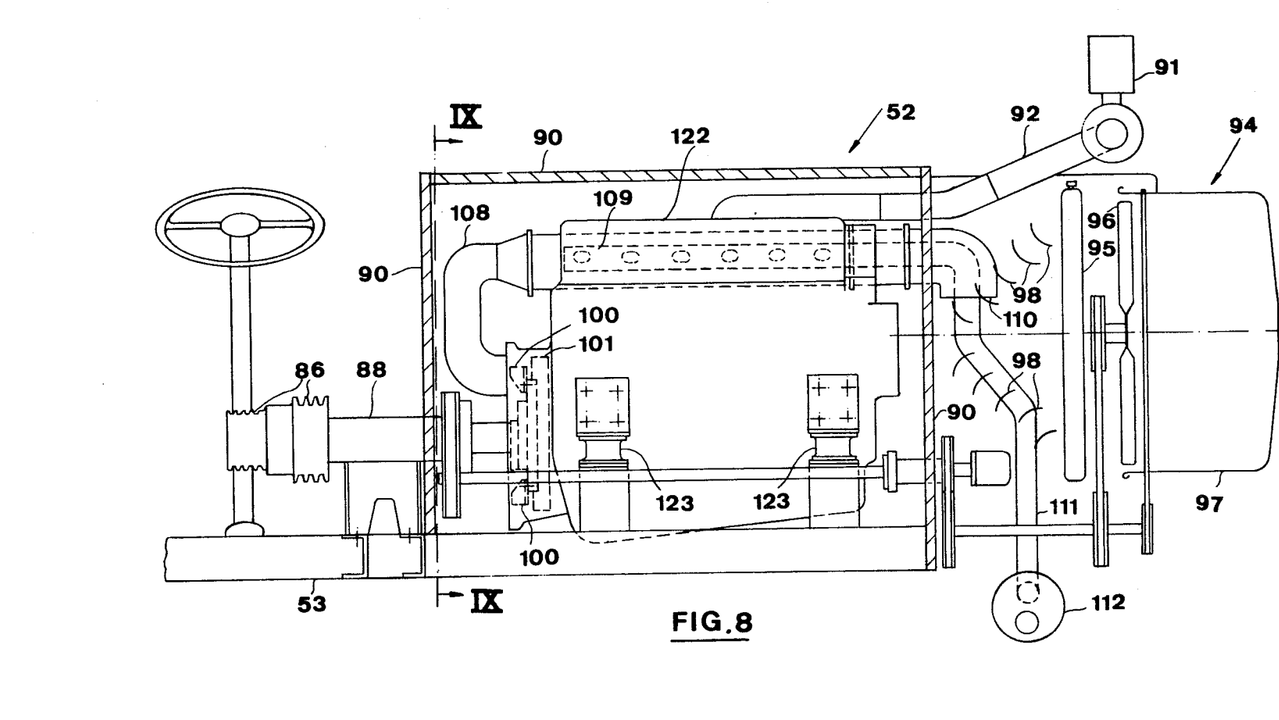
FIG. 8 is a schematic sectional view taken along the line VIII—VIII in FIG. 1.
Figure 9:
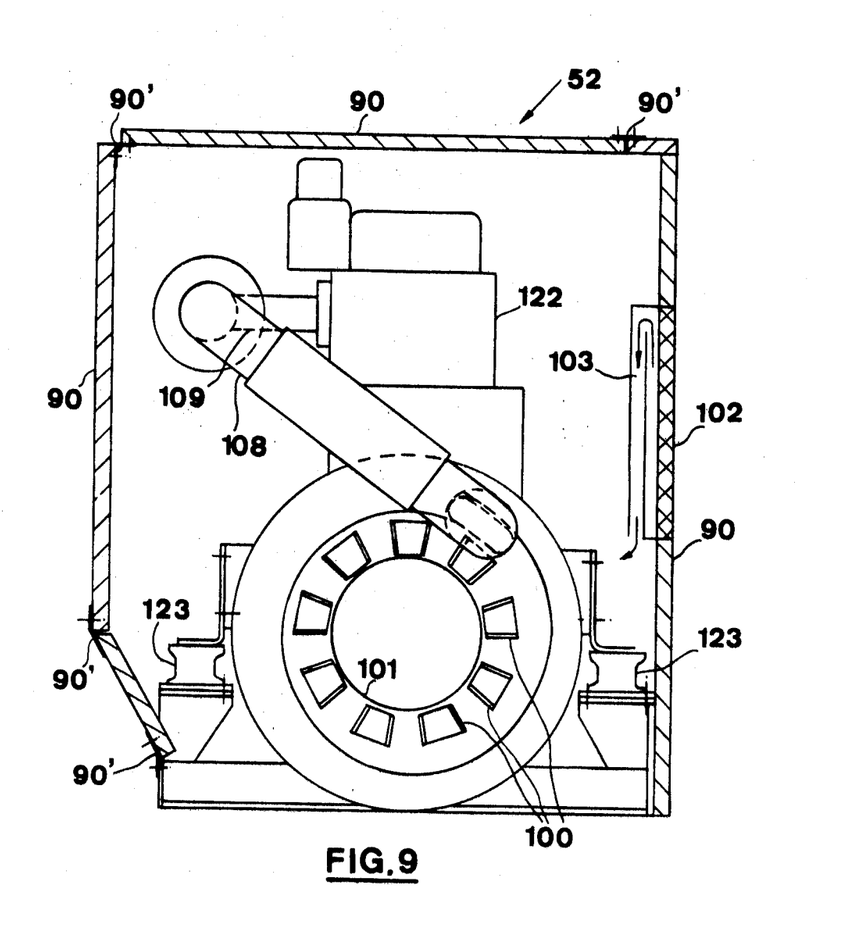
FIG. 9 is a schematic sectional view taken along the line IX—IX in FIG. 8.

The clean grain auger 29 is connected to a lower grain elevator 32 by transition means generally indicated at 33 and comprising a housing 34 (FIGS. 6 and 7) with a pair of impellers 35, 81 therein operable to transfer clean grain received from the clean grain auger 29 to the elevator 32. The elevator 32 is of the auger type and compises an auger tube 36 within which is mounted an auger 37 extending generally upwardly and driven by the clean grain auger 29 via a belt transmission 38.

The chassis 1 supports a grain tank 40 which, compared with known grain tanks, has a relatively low profile (a height of about 0.75 m) but a large surface area when seen in plan view, i.e. the length and width of the tank is substantially greater than the height. The length, or fore-and-aft dimension, of the grain tank 40 is 4 to 5 m, whereby it is approximately twice as long as known tanks. The width of the tank 40 is made as large as possible; the limitation on the width being the road regulations to which combine harvesters and other road vehicles are subject to in the various countries and which in several countries is a maximum of 3 meters. The bottom wall 41 of the grain tank 40 comprises a front base portion 42 and a rear base portion 43 inclined with respect to the front base portion. When the tank 40 is in the loading position of FIG. 1, the front base portion 42 of the bottom wall 41 is generally horizontal and the rear base portion 43 is inclined rearwardly and upwardly with respect thereto. The grain tank 40 is open at the top and at the rear end with side walls 46 being generally vertical and parallel to one another. The rear edge 44 of the bottom wall 41 is spaced below the rear upper edges 45 of the side walls 46 so as to give depth to the rear end of the tank 40. Furthermore, the grain tank 40 is pivotally mounted about a transverse pivot shaft 82 located at the rear edge 44 of the bottom wall portion 43, the shaft being supported by a subframe 47 of the chassis 1. A pair of telescopic hydraulic cylinders 48 are provided between supports 49 on the chassis 1 and brackets 50 on the grain tank bottom wall 41, the brackets being located forwardly of the pivot shaft 82 such that the weight of the tank is supported mainly by the cylinders 48 when the tank is tilted thereby during the grain unloading operation.

It will be noted that the grain tank 40 extends from immediately behind a power source 52 for the machine and an operator's platform 53 to beyond a straw hood 54 whereby it overhangs the latter. Thus the pivot shaft 82 is positioned rearwardly of the rearmost portion of the straw hood 54. The straw hood is generally composed of a reversed U-shaped member and a rear transverse wall 55 pivotally mounted at its upper edge 56. Resilient means 57 are provided between the rear wall 55 and the remainder of the straw hood 54 to urge the wall 55 towards the position as shown in FIG. 1, i.e. in a rearward direction away from the remainder of the straw hood 54. Loading of the grain tank 40 with conventional grain elevators would give rise to problems for several reasons. Due to the large surface of the grain tank 40, as seen in top view, it would be difficult to load the tank 40 fully and evenly and hence to use its full capacity, since the conventional grain elevator would extend alongside the tank with a transverse distributing conveyor located within or on top of the tank. Moreover, due to the fact that the grain tank 40 is pivoted to effect grain discharge, it is impossible to provide a stationary grain elevator extending through the grain tank bottom wall 41 as such an elevator would interfere with the tipping operation.

In order to avoid these problems a further auger tube 60 with an auger 61 therein is secured to the bottom wall 41 of the grain tank 40 and is disposed within the latter. The lower end of this auger tube 60 is aligned with an aperture 62 in the bottom wall 41 as is the upper end of the auger tube 36, and hence the augers themselves are aligned when the tank is in the loading position. It will be seen from FIGS. 3 and 6 that the auger tubes 36 and 60 are inclined slightly inwardly of the machine so that the top end 63 of the upper auger tube 60 is positioned generally above the middle of the grain tank 40. The lower auger 37 is rotatably supported at its upper end in a bearing 64 and is drivingly coupled to the auger 61 by coupling means in the form of a clutch comprising a member 65 on the shaft of the auger 37 and having a radial extension 65' which is cooperable with an engaging pin 66 of a member 66 provided on the shaft of the auger 61. The augers 37, 61 also comprise respective centring means 67, 68 at their facing ends to enable alignment to be effected prior to effecting actual coupling. The upper auger 61 is supported at its upper end in a bearing 69 in the associated auger tube 60 which allows a limited angular adjustment of the auger when the latter is coupled to the lower auger 37. The upper auger 61 supports at its upper end an impeller 39 for discharging grain through a discharge opening 83 of the auger tube 60. Resistent sealing means 70 are provided between the upper end of the lower auger tube 36 and the lower end of the upper auger tube 60. The lower and upper augers 37, 61 are driven from the clean grain auger 29 via the belt transmission 38 already referred to.

The elevator 32 is mounted at a location rearwardly of the separating mechanism 14 and within the outer ends 18 thereof.

The upper auger tube 60 supports at its upper end 63 a fore-and-aft extending additional auger structure 71 which is arranged to receive grain from the upper auger tube 60 through a discharge opening 83 and to spread the grain more or less evenly in the grain tank 40 through two opposed discharge openings 84, 85. The additional auger structure 71 comprises two auger tubes 72, 73 with associated opposed augers 74, 75 mounted therein. The augers 74, 75 are driven by the upper auger 61 via a chain and sprocket transmission 76, 77, 78, intermediate shaft 79 and a conical gear transmission 120, 121.

As a result of the rearrangement of the various components in the combine harvester and more particularly as a result of the provision of a rearwardly tipping grain tank 40 the power unit 52 is located alongside the operator's platform 53 at the forward end of the chassis 1. This results in several advantages: the linkages of control means between the operator's platform 53 and the power source 52 are shortened; more importantly, the drive transmissions from the power source 52 to the major components such as the threshing cylinders 10 and the traction wheels 2 are shortened substantially as well; the traction of the combine is improved, with an engine 122 forming part of the power source 52 and which is a heavy structure, being positioned generally above the traction wheels 2. Nevertheless, providing the power source 52 adjacent the operator's platform 53 gives rise to a disadvantage in that the noise and heat from the engine impairs the comfort of the operator to which increasing attention is being given.

The major sources of noise from an engine are the exhaust, the cooling fan, general vibration, and what can be identified as "mechanical engine noise". The exhaust noise can be reduced effectively by fitting an improved silencer 112 which is available on the market. The cooling fan noise can also effectively be reduced by installing a larger, slower running and better shaped fan which will produce less noise, yet provide similar cooling characteristics.

Noise resulting from vibrations can be reduced by reducing the vibrations themselves which is accomplished by mounting engine 122 on so called "silent blocks" 123. While doing so, the engine 122 itself can no longer take up the belt pull on the P.T.O., as is common on conventional combine harvesters and other agricultural machinery. Drive pulleys 86 have, therefor, been provided on an intermediate shaft which is supported in bearings and a sub-frame 88 on the chassis 1 and which is coupled to the engine P.T.O. via a pair of flexible coupling members. These flexible coupling members will adequately take up minor misalignments between the engine P.T.O. and the intermediate shaft. The pull of the various belts will be taken up entirely by the stationary sub-frame 88.

To reduce the level of the "mechanical engine noises", the engine 122 is enclosed in acoustic shields or panels 90 which may be of a special noise-absorbing material or of other material with noise absorbing coatings. The shields 90 are arranged in the form of a casing for the engine 122 and are hinged to one another to facilitate engine servicing as indicated at 90'. Apart from the engine 122 itself, as many components as possible are arranged outside the shields 90. The air filter 91 is coupled to the engine 122 via a duct 92 extending through one shield 90 and the entire engine cooling system 94 comprising a conventional radiator 95, cooling fan 96, and a rotary air screen 97, is also located outside the shields 90. The cooling fan 96 is arranged to suck cooling air through the rotary air screen 97 and blow it through the radiator 95 and against deflector members 98 at the opposite side of the radiator to the fan 95. The coolant is fed from the engine 122 to the radiator 95 and vice versa, through a pair of tubes (not shown) passing through a shield 90.

In order to avoid overheating within the engine casing formed by the shields 90, a vent 102 is provided in one shield 90 through which air is drawn by a fan 100 provided on a flywheel 101 of the engine 122. The vent 102 is screened by a baffle 103. The air drawn in through the vent 102 is discharged through a duct 108 which extends around an exhaust member 109 and through a discharge duct 110 extending co-axially with an exhaust pipe 111. Thus the heat from the exhaust member 109 contained with the shield casing is reduced considerably. A silencer 112 is connected to the exhaust pipe 111 and disposed entirely outside the shield casing. The narrow and elongated shape of the duct 108 acts as a muffler for reducing the noise level at the discharge end thereof.

Operation

In operation of the combine, the engine 122 is operative and even though it is positioned adjacent the operator's platform 53, the noise level is acceptable due to the various precautions described above. The harvester is driven in the field and the standing crop is cut by the cutter bar 6 and fed to the threshing means 9 where it is threshed, the resulting straw mat being passed to the straw beater 12 and separating mechanism 14 is already described. The two halves of the straw mat produced by the separator rotor 17 are subsequently discharged to the ground through the straw hood 54. All of the separated grain is passed to the cleaning means, again as already described, and thence to the augers 29, 37, 61, 74 and 75 and finally into the grain tank 40.

Figure 2:
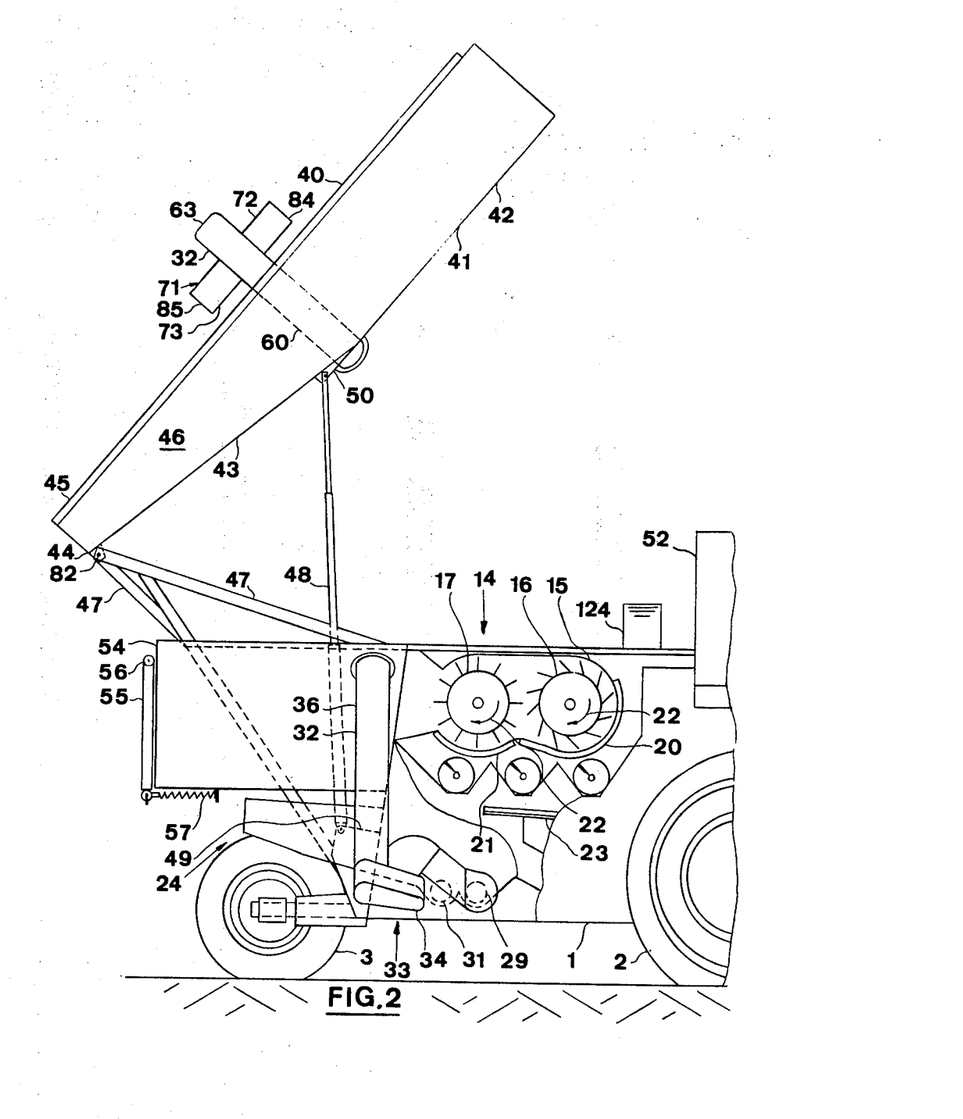
FIG. 2 is a view similar to FIG. 1 but with the grain tank in another characterising position and with certain components removed.

The grain tank 40 is held in the generally horizontal loading position during harvesting, whereby the auger tubes 36, 60 are aligned with each other and the associated augers 37, 61 are drivingly coupled together. When the grain tank 40 is fully loaded with clean grain, the combine is taken to a trailer or the like, or vice versa, in such a manner that the tank discharge end 44 is positioned above the trailer. During this operation, the rear wall 55 of the straw hood may contact the trailer but this will merely result in the wall 55 being pivoted towards the body of the machine against the spring 57 without causing any damage and yet allowing the discharge end 44 of the grain tank 40 to be better positioned with respect to the trailer. However, a warning device may be attached to the wall 5 to warn the operator when the wall contacts a trailer or the like. When the trailer is positioned correctly in relation to the combine, the hydraulic cylinders 48 are actuated to tip the gain tank 40 about the pivot shaft 82 to the position of FIG. 2 and hence discharge grain from the end 44 of the tank. The inclined bottom wall portion 43 and the depth of the rear end of the grain tank 40 facilitate grain discharge. When discharge has been completed, the hydraulic cylinders 48 are retracted and hence the tank 40 returned to the loading position, being guided by guide means 124 (FIG. 2) which help to re-align the auger tubes 36 and 60 so that the coupling between the two can be re-established. When the tank 40 is tipped, the spigot engaging pin 66' disengages the radial extension 65' of the member 65, and the end of the shaft of the auger 37 disengages the member 66 and hence the coupling between the augers 37 and 61 is broken.

The time taken to unload the grain tank 40 is very much less than that of a conventional combine, whereby the downtime of the machine is reduced and the capacity increased. It will be appreciated that the grain conveyor means comprising the lower and upper elevators in no way interferes with the tipping operation of the grain tank 40 and yet is effective, in conjunction with the augers 61, 74 and 75 in evenly and fully loading the large capacity tank. The large capacity tank also reduces the number of times the tank has to be emptied which in turn increases the effective capacity of the combine in tons per hour.

The unloading tube and unloading augers as known from conventional harvesting machines have been omitted in the present invention, which means that the number of grain conveyors of all types such as the auger-type and the paddle-type have been reduced considerably. This, apart from the cost savings, also results in less damage (crackage) being caused to grain conveyed through the machine.

The operator's comfort, and more particularly the operator's visibility mainly in rearward direction, is improved considerably by a provision of a low profile grain tank 40. This positively influences safety when operating the combine harvester as well as the manoeuvrability thereof. Furthermore, the construction of the pivotal grain tank 40, together with the grain conveyor means comprising the lower and upper elevators and the hydraulic cylinders 48 is relatively simple and therefore relatively inexpensive, compared with their counterparts in known harvesting machines.

Also when the grain tank 40 is in its raised unloading position, good access to the threshing and separating means 9, 14 is possible for service and for repair provided, of course, removable covers are provided. It is desirable that precautions are taken to avoid the grain tank 40 falling back to the loading position should there by a hydraulic failure and to this end, back-out valves may be provided in each cylinder 48.

The stability of a combine according to the present invention is improved compared with some conventional combines due to the low profile grain tank which lowers the center of gravity of the machine. Also, the heavy engine 122 is positioned generally above the traction wheels 2, whereby the weight thereof is mainly supported directly on those wheels. This also improves the traction of the traction wheels 2. Furthermore, the main drives from the engine 122 to the main combine components are shorter and thus less expensive.

Figure 10:
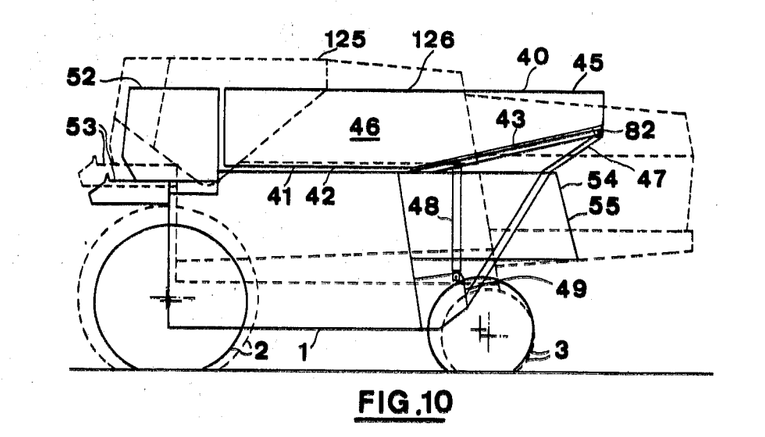
FIG. 10 is a schematic side view comparing a conventional combine harvester with the harvester of FIG. 1.

The use of rotary separator means as opposed to conventional straw walkers means that a smaller sized combine results but having the same, or an even larger, capacity as a larger conventional combine since the capacity-limiting components (straw walkers) in conventional combines have been replaced by more efficient components (rotary separator means 15, 16, 17, 20, 21). The size of the straw hood 54 is also reduced considerably. All of these size advantages can be appreciated from FIG. 10 which shows in full lines a combine harvester 126 in accordance with the invention and in broken lines a conventional combine 125.

Finally, the present invention has provided a further simplified harvesting machine, the maintenance and serviceability of which is equally further simplified.

We claim:

1. An agricultural harvesting machine comprising:
   a chassis adapted to travel across a field,
   means on the chassis for conveying crop material from the field to the chassis,
   means mounted on said chassis and adapted to receive crop material from the conveying means for threshing and separating grain from the crop material,
   means mounted on said chassis for receiving threshed and separated grain from the threshing and separating means and for cleaning said grain,
   a grain tank pivotally mounted on said chassis at a location above the level of the cleaning means for temporarily holding cleaned grain therein,
   conveyor means mounted between the cleaning means and the grain tank for loading cleaned grain in the grain tank and
   means connected between the chassis and the grain tank for tipping the grain tank and for discharging grain contained therein rearwardly of the machine.

2. An agricultural harvesting machine as described in claim 1, wherein said grain tank comprises:
   a front base portion which extends generally horizontally when the tank is in a loading position and
   a rear base portion which is upwardly inclined relative to the front base portion and which acts as a chute for unloading grain from the grain tank when the latter is pivoted to the discharge position.

3. An agricultural harvesting machine, as described in claim 2 wherein said grain tank further comprises side walls which are generally vertical and parallel to one another and wherein said side walls have a small height when compared with the fore-and-aft dimensions.

4. An agricultural harvesting machine, as described in claim 3, wherein the height of said side walls is of the range of 0.75 m.

5. An agricultural harvesting machine, as described in claim 4, wherein said grain tank is open at the top and at the rear end.

6. An agricultural harvesting machine, as described in claim 1, wherein said grain tank comprises a pivot axis disposed transversely and rearwardly of the harvesting machine and in the vicinity above the top rear edge of the chassis for pivotally mounting said grain tank on the chassis.

7. An agricultural harvesting machine, as described in claim 6, wherein the grain tank tipping means comprise hydraulic means disposed between the grain tank at a location forwardly of the pivot axis and the chassis for pivoting the grain tank to and from the discharge position around said pivot axis.

8. An agricultural harvesting machine, as described in claim 7, further comprising:
   a straw hood defining a straw outlet opening and mounted at the rear end of the chassis, and
   wherein the rear edge of the grain tank overhangs the straw hood in a rearward direction.

9. An agricultural harvesting machine as described in claim 8 wherein the straw hood comprises:
   a generally reversed U-shaped member,
   a rear wall extending transversely of the machine and pivotally mounted to the U-shaped member, and
   resilient means mounted between the U-shaped member and the rear wall for resiliently urging the rear wall away from the U-shaped member.

10. An agricultural harvesting machine, as described in claim 1, further comprising:
    an operator's platform mounted to the chassis at the forward end thereof and
    wherein the grain tank is mounted on top of the harvesting machine and extends from adjacent the operator's platform in a rearward direction to a location rearwardly of the rear end of the chassis.

11. An agricultural harvesting machine comprising:
    a chassis adapted to travel across a field,
    an operator's platform mounted on the chassis at its forward end,
    first conveyor means mounted on the chassis at a location below the operator's platform for conveying crop material from the field to the chassis,
    threshing and separating means mounted on the chassis and adapted to receive crop material from the conveyor means and to thresh and separate grain from the crop material,
    grain cleaning means mounted on the chassis for receiving threshed and separated grain from the threshing and separating means and for cleaning said grain,
    a grain tank provided on top of the chassis and extending from adjacent the operator's platform in rearward direction to a location rearwardly of the rear end of the chassis and comprising a pivot axis disposed transversely of the harvesting machine for pivotally mounting said grain tank on the chassis, and the grain tank being adapted for temporarily holding cleaned grain therein,
    hydraulic means disposed between the grain tank at a location forwardly of the pivot axis, and the chassis for tipping the grain tank and for discharging grain contained therein rearwardly of the machine, and for pivoting the grain tank from its discharge position back to its generally horizontal position, second conveyor means mounted between the cleaning means and the grain tank for loading cleaned grain in the grain tank, said grain tank comprising;

a front base portion extending generally horizontally when the tank is in a loading position, a rear base portion which is upwardly inclined relative to the front base portion and which acts as a chute for unloading grain from the grain tank when the latter is pivoted to the discharge position, and side walls extending generally vertically and parallel to one another.

12. An agricultural harvesting machine, as described in claim 11 further comprising a rearwardly extending subframe, which is mounted at one end to the rear end of the chassis and which is adapted to receive the grain tank pivot axis adjacent its opposite end.

13. An agricultural harvesting machine comprising:

a chassis adapted to travel across a field, means mounted on the chassis for conveying crop material from the field to the chassis, means mounted on said chassis and adapted to receive crop material from the conveying means for threshing and separating grain from the crop material, means mounted on said chassis for receiving threshed and separated grain from the threshing and separating means and for cleaning said grain, a grain tank pivotally mounted on said chassis and adapted for temporarily holding cleaned grain therein, loading means for receiving clean grain and conveying it into the grain tank comprising;

a first elevator means extending from the grain cleaning means to the grain tank, second elevator means mounted within the grain tank and aligned with said first elevator means when the grain tank is in a grain loading position and disengageable coupling means disposed between the first and second elevator means for coupling said elevator means to one another when the grain tank is in the grain loading position.

14. An agricultural harvesting machine as described in claim 13, wherein the first elevator means extends in an upwardly and inwardly inclined direction from one side of the grain cleaning means and wherein the upper end of the second elevator means is positioned generally above the middle of the grain tank.

15. An agricultural harvesting machine as described in claim 14 wherein the first and second elevator means are of the auger type comprising auger tubes and augers arranged therein.

16. An agricultural harvesting machine as described in claim 15, wherein the first auger tube with the auger therein extends to an opening in the base of the grain tank and wherein the second auger tube with an auger therein extends from said opening in the base of the grain tank in upward direction inside said grain tank.

17. An agricultural harvesting machine as described in claim 13 wherein the first and second elevator means are of the auger type comprising auger tubes and augers arranged therein, and wherein the coupling means comprise:

an extension carried by one auger at its end facing the other auger, an engaging pin carried by the other auger at its end facing the first auger and engageable with said extension when the grain tank is in the loading position, and centering means on the first and second auger to facilitate alignment of the augers on movement of the grain tank from the discharge position to the loading position.

18. An agricultural harvesting machine as described in claim 13 further comprising disengageable sealing means between the first and second elevator means, the seal being broken on movement of the grain tank to the discharge position and being re-established on movement to the loading position.

19. An agricultural harvesting machine as described in claim 13 further comprising:

a clean grain auger extending transversely below the cleaning means and operable to collect clean grain from the cleaning means and to convey this clean grain transversely to its discharge end, and transition means mounted between the clean grain auger and the first elevator means for transferring clean grain from the clean grain auger to the first elevator means, said transition means comprising;

a housing and impeller means mounted therein said operable to feed grain from the clean grain auger to the first elevator means.

20. An agricultural harvesting machine as described in claim 13 further comprising grain dividing means which are associated with the upper end of the second elevator means and which are operable to load the grain substantially evenly in the grain tank.

21. An agricultural harvesting machine, as described in claim 20 wherein the grain dividing means comprise two opposed auger conveyors which extend in fore-and-aft direction of the machine.

22. An agricultural harvesting machine, as descrivbed in claim 21 wherein the said elevator means comprises an impeller at its discharge end and which is operable to feed grain from the second elevator means to the grain divider means.

* * * * *